(12) United States Patent
Nagasawa et al.

(10) Patent No.: US 10,666,821 B2
(45) Date of Patent: May 26, 2020

(54) IMAGE PROCESSING APPARATUS, CONTROL METHOD AND CUSTOMIZING INFORMATION

(71) Applicant: Konica Minolta, Inc., Tokyo (JP)

(72) Inventors: Kenichi Nagasawa, Takatsuki (JP); Nordès Ménard-Lamarre, Takarazuka (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/406,213

(22) Filed: May 8, 2019

(65) Prior Publication Data

US 2019/0356797 A1    Nov. 21, 2019

(30) Foreign Application Priority Data

May 15, 2018    (JP) .................. 2018-093847

(51) Int. Cl.
*H04N 1/00* (2006.01)
*H04N 1/44* (2006.01)

(52) U.S. Cl.
CPC ..... *H04N 1/00514* (2013.01); *H04N 1/00498* (2013.01); *H04N 1/4433* (2013.01); *H04N 2201/0094* (2013.01)

(58) Field of Classification Search
CPC ........... H04N 1/00514; H04N 1/00498; H04N 1/4433; H04N 2201/0094
USPC ....................................................... 358/1.13
See application file for complete search history.

(56) References Cited

U.S. PATENT DOCUMENTS

| | | | |
|---|---|---|---|
| 2016/0156804 A1* | 6/2016 | Suzuki | H04N 1/32122 358/1.11 |
| 2016/0269384 A1* | 9/2016 | Suga | H04W 12/06 |
| 2017/0155780 A1* | 6/2017 | Ishihara | G06F 3/1204 |
| 2018/0152599 A1* | 5/2018 | Fukuda | H04N 1/4433 |

FOREIGN PATENT DOCUMENTS

| | | |
|---|---|---|
| JP | 2012-051376 A | 3/2012 |
| JP | 2016-076962 A | 5/2016 |
| JP | 2017-103541 A | 6/2017 |

* cited by examiner

*Primary Examiner* — Allen H Nguyen
(74) *Attorney, Agent, or Firm* — Osha Liang LLP

(57) ABSTRACT

An image processing apparatus includes: a processor; a first interface that acquires information for user authentication; a second interface that acquires information for user identification; and a memory that stores a customization information table defining information for customizing an operation screen displayed on the first interface. The processor displays: when the first interface acquires the information for the user authentication, an operation screen customized, using the customization information table, for a user authenticated through the user authentication as the operation screen, and when the first interface does not acquire the information for the user authentication, an operation screen customized, using the customization information table, for a user identified by the information acquired by the second interface as the operation screen.

13 Claims, 10 Drawing Sheets

CUSTOMIZATION INFORMATION TABLE

| USERNAME | PASSWORD | CUSTOM INFORMATION | ALLOWED FUNCTIONS | TYPE | ID |
|---|---|---|---|---|---|
| Yamada | Yamada | A (JAPANESE) | COPY, SCAN | — | — |
| Michel | Michel | B (GERMAN) | COPY, PRINT | — | — |
| John | 1234 | C (ENGLISH) | COPY, SCAN | — | — |
| Sato | 0101 | A (JAPANESE) | COPY, PRINT | — | — |
| Public | — | A (JAPANESE) | COPY | BEACON | AACD:fFFA |
| Public | — | C (ENGLISH) | COPY | IC CARD | AAAABBCCDD |

FIG.3

CUSTOMIZATION INFORMATION TABLE

| USERNAME | PASSWORD | CUSTOM INFORMATION | ALLOWED FUNCTIONS | TYPE | ID |
|---|---|---|---|---|---|
| Yamada | Yamada | A (JAPANESE) | COPY, SCAN | — | — |
| Michel | Michel | B (GERMAN) | COPY, PRINT | — | — |
| John | 1234 | C (ENGLISH) | COPY, SCAN | — | — |
| Sato | 0101 | A (JAPANESE) | COPY, PRINT | — | — |
| Public | — | A (JAPANESE) | COPY | BEACON | AACD:fFFA |
| Public | — | C (ENGLISH) | COPY | IC CARD | AAAABBCCDD |

FIG.6

USER TABLE

| TYPE | ID | CUSTOM INFORMATION |
|---|---|---|
| BEACON | AACD:fFF1 | — |

FIG.7

USER TABLE

| TYPE | ID | CUSTOM INFORMATION |
|---|---|---|
| BEACON | AACD:fFF1 | A(JAPANESE) |

FIG.9

CUSTOMIZATION INFORMATION TABLE

| USERNAME | PASSWORD | CUSTOM INFORMATION | ALLOWED FUNCTIONS | TYPE | ID |
|---|---|---|---|---|---|
| Yamada | Yamada | A (JAPANESE) | COPY, SCAN | — | — |
| Michel | Michel | B (GERMAN) | COPY, PRINT | — | — |
| John | 1234 | C (ENGLISH) | COPY, SCAN | — | — |
| Sato | 0101 | A (JAPANESE) | COPY, PRINT | — | — |
| Public | — | A (JAPANESE) | COPY | BEACON | AACD:fFFA |
| Public | — | C (ENGLISH) | COPY | IC CARD | AAAABBCCDD |
| Public | — | A (JAPANESE) | COPY | BEACON | AACD:fFF1 |

FIG.10

CUSTOMIZATION INFORMATION TABLE

| USERNAME | PASSWORD | CUSTOM INFORMATION (DEFAULT SETTINGS) | ALLOWED FUNCTIONS | TYPE | ID |
|---|---|---|---|---|---|
| Yamada | Yamada | PAGE INTEGRATION: 2in1<br>OUTPUT: COLOR<br>READ: COLOR<br>SAVE DESTINATION: BOX A | COPY, SCAN | — | — |
| Michel | Michel | PAGE INTEGRATION: NO<br>OUTPUT: MONOCHROME<br>READ: MONOCHROME | COPY, PRINT | — | — |
| Public | — | PAGE INTEGRATION: 4in1<br>OUTPUT: COLOR<br>READ: COLOR | COPY | BEACON | AACD:fFFA |

FIG.11

CUSTOMIZATION INFORMATION TABLE

| USERNAME | PASSWORD | CUSTOM INFORMATION | ALLOWED FUNCTIONS | TYPE | ID |
|---|---|---|---|---|---|
| Yamada | Yamada | A (JAPANESE) | COPY, SCAN | BEACON | AACD:AAAA |
| Michel | Michel | B (GERMAN) | COPY, PRINT | — | — |
| John | 1234 | C (ENGLISH) | COPY, SCAN | — | — |
| Sato | 0101 | A (JAPANESE) | COPY, PRINT | — | — |
| Public | — | A (JAPANESE) | COPY | BEACON | AACD:1FFA |
| Public | — | C (ENGLISH) | COPY | IC CARD | AAAABBCCDD |

IMAGE PROCESSING APPARATUS, CONTROL METHOD AND CUSTOMIZING INFORMATION

CROSS-REFERENCE TO RELATED APPLICATIONS

The entire disclosure of Japanese Patent Application No. 2018-093847, filed on May 15, 2018, is incorporated herein by reference in its entirety.

BACKGROUND

Technical Field

The present invention relates to image processing apparatuses and methods of controlling the same, and more specifically to an image processing apparatus allowed to be used through user authentication and a method of controlling the same.

Description of the Related Art

Some image processing apparatuses such as MFPs (Multi-Functional Peripherals) require user authentication when they are to be used. Japanese Laid-Open Patent Publication Nos. 2012-051376, 2016-076962 and 2017-103541, for example, each disclose a technique of allowing an image processing apparatus to be used through user authentication, and customizing an operation screen in accordance with an authenticated user.

SUMMARY

There have also been proposed image processing apparatuses capable of operating in a mode that allows use of the apparatus through user authentication as described above, and also in a mode that allows use of the apparatus without user authentication (so-called public mode).

There exists a need to enable an image processing apparatus to operate in a manner customized for each user in the public mode as well, thereby improving convenience.

According to one or more embodiments, an image processing apparatus comprises: a processor; a memory that stores a customization information table defining information used to customize an operation screen of the image processing apparatus; a first interface that acquires information for user authentication; and a second interface that acquires information for user identification. The processor displays, when the first interface acquires the information required for user authentication, an operation screen customized using the customization information table for a user authenticated through the user authentication. The processor displays, when the first interface does not acquire the information required for user authentication, an operation screen customized using the customization information table for a user identified by the information acquired by the second interface.

According to one or more embodiments, a method of controlling an image processing apparatus is provided. The method comprises determining, by a computer of the image processing apparatus, whether or not a first interface acquires information required for user authentication. The method comprises displaying, by the computer, when the first interface acquires the information required for user authentication, an operation screen customized using a customization information table for a user authenticated through the user authentication, the customization information table defining information used to customize an operation screen of the image processing apparatus. The method comprises displaying, by the computer, when the first interface does not acquire the information required for user authentication, an operation screen customized using the customization information table for a user identified by information acquired by a second interface that acquires information for user identification.

According to one or more embodiments, a non-transitory recording medium storing a program executed by a computer of an image processing apparatus is provided. The image processing apparatus comprises a first interface that acquires information for user authentication, a second interface that acquires information for user identification, and a memory that stores a customization information table defining information used to customize an operation screen of the image processing apparatus. The program causes the computer to: determine whether or not the first interface acquires the information required for user authentication; when the first interface acquires the information required for user authentication, display an operation screen customized using the customization information table for a user authenticated through the user authentication; and when the first interface does not acquire the information required for user authentication, display an operation screen customized using the customization information table for a user identified by the information acquired by the second interface.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 3 shows example contents of a customization information table according to one or more embodiments.

FIG. 6 shows example contents of a user table according to one or more embodiments.

FIG. 7 shows an example user table to which custom information has been added according to one or more embodiments.

FIG. 9 shows the customization information table of FIG. 3, in which a registered set of data of FIG. 7 has been registered.

FIG. 10 represents another example customization information table according to one or more embodiments.

FIG. 11 shows example contents of the customization information table, to which an ID of a successfully authenticated user has been added according to one or more embodiments.

DETAILED DESCRIPTION

Hereinafter, embodiments of the present invention will be described with reference to the drawings. However, the scope of the invention is not limited to the disclosed embodiments.

An MFP implementing multiple functions such as copying, printing, scanning and faxing, which is one or more embodiments of an image processing apparatus, is described below with reference to the drawings. In the following descriptions, the same parts and components are designated by the same characters. Their names and functions are also the same. Thus, description thereof will not be repeated.

[1. Configuration of MFP]

Figure 1:
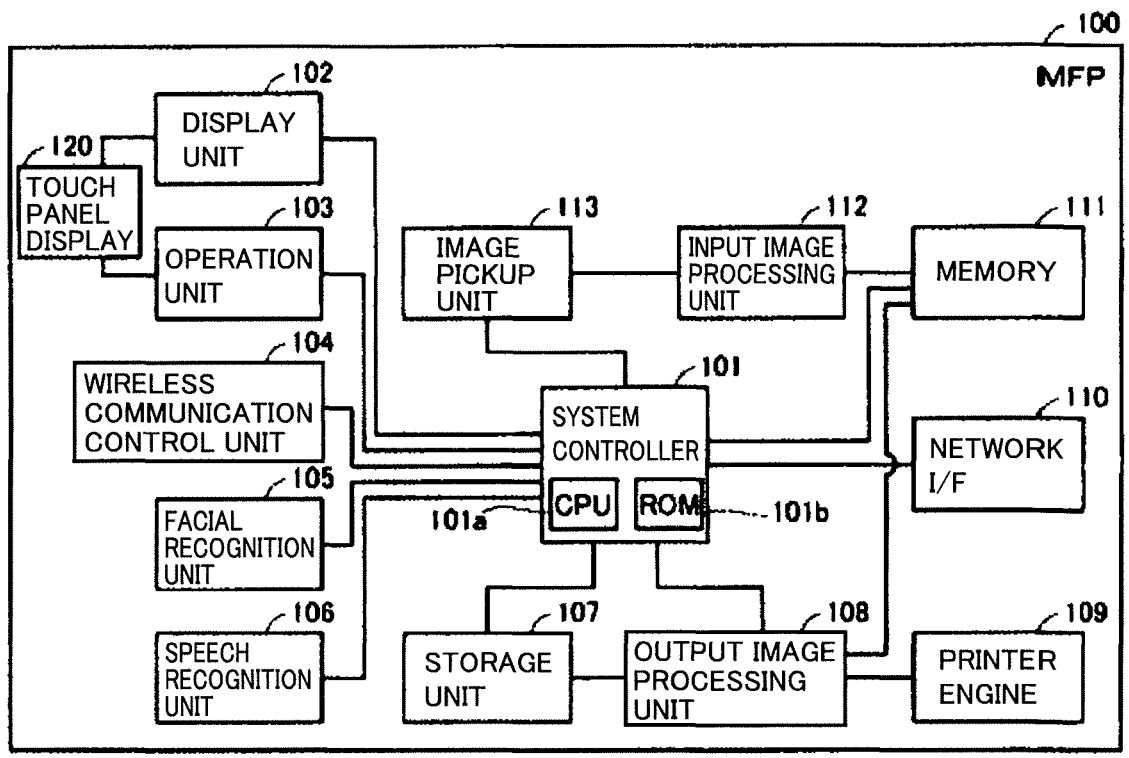
FIG. 1 shows an example hardware configuration of an MFP according to one or more embodiments.

FIG. 1 shows an example hardware configuration of an MFP according to one or more embodiments. The configuration of an MFP 100 is described with reference to FIG. 1.

MFP 100 includes a system controller 101, a display unit 102, an operation unit 103, a wireless communication control unit 104, a facial recognition unit 105, a speech recognition unit 106, a storage unit 107, an output image processing unit 108, a printer engine 109, a network interface 110, a memory 111, an input image processing unit 112, and an image pickup unit 113. These elements are interconnected. MFP 100 further includes a touch panel display 120 connected to display unit 102 and operation unit 103.

System controller 101 controls MFP 100 as a whole. System controller 101 includes a CPU (Central Processing Unit) 101a and a ROM (Read Only Memory) 101b. CPU 101a operates in accordance with a control program. ROM 101b stores the control program.

Display unit 102 displays various types of information to touch panel display 120. Examples of the displayed information include an operation screen of MFP 100. The operation screen accepts input of settings for copying operation (page integration, color/monochrome output, and the like) and settings for scanning operation (monochrome/color read, resolution, and the like). The copying operation refers to, for example, operation of reading an image on a document by image pickup unit 113, and forming this image on a sheet of paper by printer engine 109. The scanning operation refers to, for example, operation of reading an image on a document by image pickup unit 113, and generating data of this image by CPU 101a. The printing operation refers to, for example, operation of forming an image of a file received via network interface 110 or an image of a file stored in storage unit 107 onto a sheet of paper.

Operation unit 103 accepts various types of operations via touch panel display 120. Wireless communication control unit 104 makes a wireless LAN connection to an external terminal, receives radio waves sent via iBeacon® from an external terminal, and the like.

Facial recognition unit 105 picks up an image of the face of a user or of the entire user and performs facial recognition and feature point determination, to recognize the user.

Speech recognition unit 106 conducts a voice print analysis based on the voice of a user, to recognize the user. Speech recognition unit 106 also identifies an inputted speech, and sets items such as a menu correlated with the recognized speech words.

Storage unit 107 is a hard disk device or the like, and stores various types of information. Examples of the stored information include information used for user authentication. MFP 100 authenticates a user by using a combination of a username and a password. A specific user (for example, a user preauthorized by an administrator of a network to which MFP 100 belongs) is authenticated by inputting a password provided to a username of this user, and can thereby use MFP 100 in a specific manner.

Examples of the information stored in storage unit 107 also include information used to identify a user. A user can use MFP 100 under certain limitations without inputting a username and a password. The operation of MFP 100 in such a manner is herein also referred to as operation in a "public mode." In one example, the certain limitations mean limitations to be imposed on the functions performed by MFP 100. For example, in the public mode, MFP 100 can perform only a copying function out of functions such as copying, printing, scanning and faxing.

Output image processing unit 108 processes image data to create print data. Printer engine 109 prints the print data created by output image processing unit 108 onto a sheet of paper. Printer engine 109 is generally formed of a toner image forming unit, a fixing device, a sheet transporting unit and the like. Printer engine 109 forms an image on a sheet of paper based on electrophotography, for example. The toner image forming unit employs a so-called tandem system to compose a four-color image, to form a color image on the sheet. The toner image forming unit is formed of a photoreceptor provided for each of the colors of C (cyan), M (magenta), Y (yellow) and K (black), an intermediate transfer belt to which a toner image is transferred from the photoreceptor (primary transfer), a transfer unit to transfer the image from the intermediate transfer belt to the sheet (secondary transfer), and the like. The fixing device has a heating roller and a pressure roller. The fixing device transports the sheet on which the toner image has been formed while pinching the sheet between the heating roller and the pressure roller, to heat and apply pressure to the sheet. As a result, the fixing device melts the toner that has adhered to the sheet to fix the toner onto the sheet, to thereby form an image on the sheet. The sheet transporting unit is formed of a paper feed roller, a transport roller, a motor to drive these rollers, and the like. The sheet transporting unit feeds a sheet of paper from a paper feed cassette and transports the sheet within a housing of MFP 100. The sheet transporting unit also discharges the sheet on which an image has been formed from the housing of MFP 100 to a paper output tray or the like.

Network interface 110 conducts communications with external devices via a network under control of system controller 101.

Memory 111 temporarily stores various types of information such as images. Input image processing unit 112 processes input image data read by image pickup unit 113.

Image pickup unit 113 functions as a scanner to read an image. When MFP 100 operates as a printer, an image is printed by printer engine 109. When MFP 100 operates as a copier, an image on a document is read by image pickup unit 113, and the image is printed by printer engine 109. The illustration and description of facsimile function of MFP 100 are not provided.

[2. Examples of Input of Information Used to Identify User]

Figure 2:
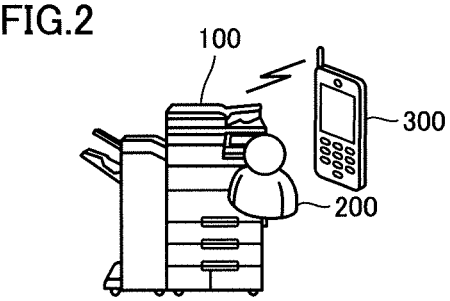
FIG. 2 shows an example manner in which information used by the MFP to identify a user is inputted according to one or more embodiments.

FIG. 2 shows an example manner in which information used by MFP 100 to identify a user is inputted according to one or more embodiments.

In FIG. 2, a user 200 carrying a portable terminal 300 is located near MFP 100 in order to operate MFP 100.

Portable terminal 300 transmits a beacon including an ID of portable terminal 300. The ID of portable terminal 300 is an example of information used to identify the user carrying portable terminal 300. Wireless communication control unit 104 receives this beacon. CPU 101*a* of system controller 101 causes the ID included in the received beacon to be stored in a user table described later (FIG. 3), for example.

The input of the information used to identify a user to MFP 100 is not limited to the manner in which a beacon is used. Other examples include a manner in which an IC (Integrated Circuit) card is used. In this case, a user carries an IC card, and MFP 100 includes a near field wireless communication device as wireless communication control unit 104. When the user bring the IC card closer to wireless communication control unit 104, wireless communication control unit 104 reads an ID stored in the IC card. The ID of the IC card is an example of information used to identify the user carrying this IC card.

As yet another example, MFP 100 may acquire a facial image or speech information (such as the voice of a user) as the information used to identify a user.

MFP 100 may acquire input of the information used to identify a user in a plurality of manners. For example, MFP 100 may include a receiver to accept input of an ID by means of a beacon, and may further include a communication device to read an ID stored in an IC card. MFP 100 may identify a user by using a combination of pieces of information acquired in the plurality of manners, respectively, or by using information selected in accordance with prescribed criteria out of pieces of information acquired in the plurality of manners, respectively.

[3. Update of Customization Information Table]

FIG. 3 shows example contents of a customization information table according to one or more embodiments. MFP 100 includes information used to customize the operation screen for each user. The contents of this table are more specifically described below. The customization information table is stored in storage unit 107, for example, but may be stored in another storage unit.

As shown in FIG. 3, the customization information table includes "username," "password," "custom information," "allowed functions," "type," and "ID".

The "username" and the "password" are used for authentication of each user. When a combination (a username and a password) inputted by a user matches a combination registered in the customization information table, CPU 101*a* causes this user to be authenticated. The "user" in this case may be an individual or a group. Namely, a combination of a username and a password common to one group may be used for two or more users belonging to this group.

The "custom information" is information used to customize the operation screen. When a user is authenticated, CPU 101*a* causes the operation screen to be customized using custom information associated with this user. As the custom information, language on the operation screen is adopted in the example of FIG. 3. The custom information for a username "Yamada" is "A (Japanese)", and the custom information for a username "Michel" is "B (German)." In this case, CPU 101*a* causes the operation screen to be displayed in Japanese when a user having the username "Yamada" is authenticated, and causes the operation screen to be displayed in German when a user having the username "Michel" is authenticated.

The "custom information" specifies, when a plurality of functions are allowed for a user, a function corresponding to the initial screen. In one example, the "custom information" for a user allowed to perform copying and scanning specifies that a setting screen for copying be displayed as the initial screen. This setting screen for copying includes an operation unit used to switch the function of an operation object from copying to scanning.

The "allowed functions" represent functions allowed for each user. For the username "Yamada," for example, "copy" and "scan" are set as allowed functions. For the username "Michel," "copy" and "print" are set as allowed functions. The "copy," "scan" and "print" correspond to the copying operation, scanning operation and printing operation in MFP 100, respectively.

When the user having the username "Yamada" has logged in, CPU 101*a* causes execution of the copying operation and the scanning operation, and does not cause execution of the printing operation. As a result, only the copying operation and the scanning operation are allowed for the user having the username "Yamada."

When the user having the username "Michel" has logged in, CPU 101*a* causes execution of the copying operation and the printing operation, and does not cause execution of the scanning operation. As a result, only the copying operation and the printing operation are allowed for the user having the username "Michel."

MFP 100 provides a certain function(s) (for example, the copying function) in the public mode for a user not authenticated through user authentication as well. In the public mode, MFP 100 provides an operation screen customized for a user identified by the method shown in FIG. 2 and the like. In the customization information table of FIG. 3, users not authenticated through user authentication but identified by an ID of a beacon or the like are registered as a username "Public." MFP 100 commonly allows the certain function described above for users registered as the username "Public." The "type" in the customization information table represents the type of information used to identify a user. When a user is identified by a beacon, "beacon" is used as the value of the "type." When a user is identified by an IC card, "IC card" is used as the value of the "type."

The "ID" is information used to identify a user. In one example, the ID is extracted from a beacon signal and registered in the customization information table. In another example, the ID is extracted from information read from an IC card and registered in the customization information table.

In the example of FIG. 3, for example, an ID "AACD:fFFA" of a beacon is registered. The custom information "A (Japanese)" is associated with the ID "AACD:fFFA." As a result, when a user uses MFP 100 without being authenticated, and the ID "AACD:fFFA" is acquired from a received beacon, CPU 101*a* causes the operation screen to be displayed in Japanese.

[4. Flow of Process for Displaying Operation Screen]

Figure 4:
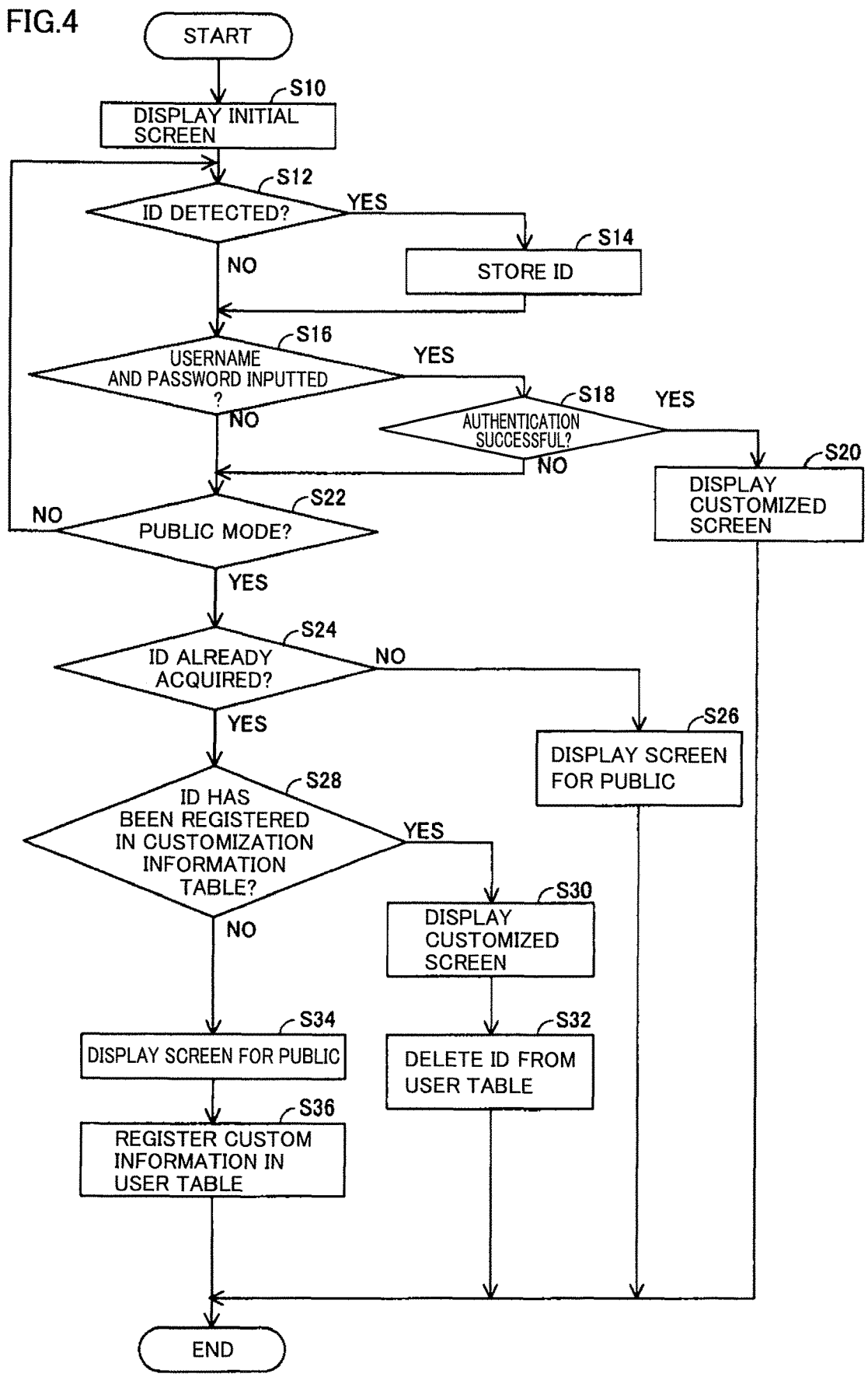
FIG. 4 is a flowchart of a process for determining a display manner on an operation screen according to one or more embodiments.

FIG. 4 is a flowchart of a process for determining a display manner on the operation screen according to one or more embodiments. The process of FIG. 4 is implemented by CPU 101*a* executing a given program, for example. CPU 101*a* causes the process of FIG. 4 to start when MFP 100 is activated or after a user has logged out, for example. The contents of this process are described with reference to FIG. 4.

Figure 5:
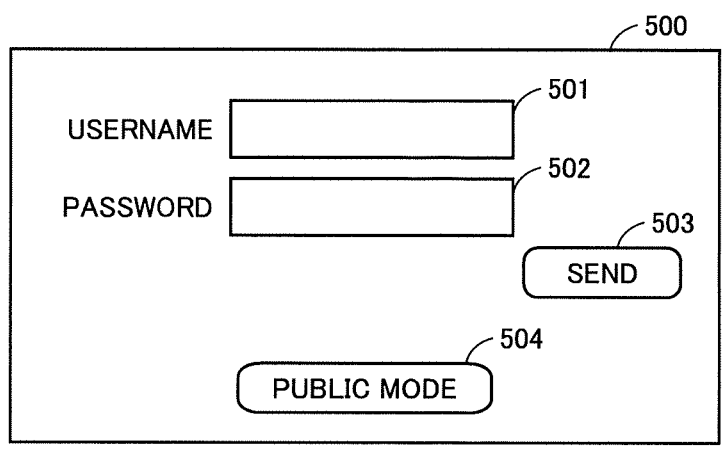
FIG. 5 shows an example initial screen according to one or more embodiments.

In step S10, CPU 101*a* causes touch panel display 120 to show an initial screen. FIG. 5 shows an example initial screen according to one or more embodiments.

An initial screen 500 is a log-in screen, for example, and includes a field 501 for inputting a username, a field 502 for inputting a password, and a send button 503 for confirming a combination of the inputted username and password.

Initial screen 500 further includes a public mode button 504 for operating MFP 100 in the public mode.

Returning to FIG. 4, in step S12, CPU 101a determines whether or not wireless communication control unit 104 has detected an ID. In one example, when wireless communication control unit 104 receives a beacon, wireless communication control unit 104 detects an ID included in this beacon. In another example, wireless communication control unit 104 communicates with an IC card to detect an ID stored in this IC card. When it is determined that wireless communication control unit 104 has detected an ID from a beacon or the like (YES in step S12), CPU 101a causes the control to proceed to step S14, and otherwise (NO in step S12) causes the control to proceed to step S16.

In step S14, CPU 101a causes the ID detected in step S12 to be stored in a user table. The user table is information used for the process of FIG. 4 and is stored in storage unit 107, for example, but may be stored in another storage unit.

FIG. 6 shows example contents of the user table according to one or more embodiments. As shown in FIG. 6, the user table includes a type, an ID, and custom information. The type represents the type of a method by which the information used to identify a user (ID) is acquired. When the ID is acquired from a beacon, the value of the type is "beacon." When the ID is acquired from an IC card, the value of the type is "IC card." The ID is the value of an acquired ID. The custom information represents the setting added to the operation screen in operation related to the acquired ID. The example of FIG. 6 represents an ID "AACD:fFF1" acquired from a beacon.

Returning to FIG. 4, in step S16, CPU 101a determines whether or not a username and a password have been inputted to the initial screen, and send button 503 has also been pressed. When it is determined that a username and a password have been inputted and send button 503 has been pressed (YES in step S16), CPU 101a causes the control to proceed to step S18, and otherwise (NO in step S16) causes the control to proceed to step S22.

In step S18, CPU 101a determines whether or not the user has been successfully authenticated by a combination of the inputted username and password. When the inputted combination matches one of the registered combinations of FIG. 3, for example, CPU 101a determines that the user has been successfully authenticated. When it is determined that the user has been successfully authenticated (YES in step S18), CPU 101a causes the control to proceed to step S20, and otherwise (NO in step S18) causes the control to proceed to step S22.

In step S20, CPU 101a causes touch panel display 120 to show a screen customized for the authenticated user as the operation screen, and causes the process of FIG. 4 to end. In the example of FIG. 3, the custom information for the user having the username "Yamada" is "A (Japanese)." When the user having the username "Yamada" is authenticated, CPU 101a causes the operation screen in Japanese to be displayed. CPU 101a then performs operation in accordance with instructions from the authenticated user until this user logs out.

In step S22, CPU 101a determines whether or not public mode button 504 has been pressed. When it is determined that public mode button 504 has been pressed (YES in step S22), CPU 101a causes the control to proceed to step S24, and otherwise (NO in step S22) causes the control to return to step S12.

In step S24, CPU 101a determines whether or not an ID has already been acquired in step S14. When an ID has been stored in the user table (FIG. 6), for example, CPU 101a determines that an ID has already been acquired. When it is determined that an ID has already been acquired (YES in step S24), CPU 101a causes the control to proceed to step S28, and otherwise (NO in step S24) causes the control to proceed to step S26.

In step S26, CPU 101a causes touch panel display 120 to show an operation screen for the public, and causes the process of FIG. 4 to end. The operation screen for the public is a standard screen for the public mode, which has not been customized for a specific user.

In step S28, CPU 101a determines whether or not the ID registered in the user table has been registered in the customization information table. For example, when the ID stored in the user table is "AACD:fFFA," the ID has been registered in the customization information table shown in FIG. 3. When the ID stored in the user table is "AACD:fFF1" (FIG. 6), the ID has not been registered in the customization information table shown in FIG. 3. When it is determined that the aforementioned ID has been registered in the customization information table (YES in step S28), CPU 101a causes the control to proceed to step S30, and otherwise (NO in step S28) causes the control to proceed to step S34.

In step S30, CPU 101a causes touch panel display 120 to show a screen customized for the ID registered in the user table as the operation screen. The operation screen is customized in accordance with custom information associated with this ID in the customization information table. When the ID is "AACD:fFFA," for example, the operation screen in Japanese is displayed in accordance with the custom information "A (Japanese)."

In step S32, CPU 101a causes the registered ID to be deleted from the user table. CPU 101a then causes the process of FIG. 4 to end.

In step S34, CPU 101a causes touch panel display 120 to show the operation screen for the public.

In step S36, CPU 101a causes the setting for the operation screen, which has been detected until the end of operation by the user whose ID was detected in step S12, to be registered in the user table as custom information. CPU 101a then causes the process of FIG. 4 to end.

FIG. 7 shows an example user table to which the custom information has been added according to one or more embodiments. In the example represented in FIG. 7, the user having the ID "AACD:fFF1" shown in FIG. 6 has inputted "Japanese" as the setting for language on the operation screen. In the table of FIG. 7, the custom information "A (Japanese)" has been added to the table of FIG. 6.

One example of the end of operation by the user whose ID was detected in step S12 is that the beacon detected in step S12 is no longer detected. When the user carrying a beacon transmitter ends the operation of MFP 100 and leaves MFP 100, wireless communication control unit 104 no longer detects the beacon transmitted from the beacon transmitter. Another example of the end of the user's operation is that the user inputs information indicating the end of operation.

In the process of FIG. 4 described above, when a user inputs a combination of a username and a password, MFP 100 attempts to authenticate the user based on this combination. When the user is successfully authenticated (YES in step S18), MFP 100 displays an operation screen customized for the authenticated user (step S20). When MFP 100 is to be used in the public mode that does not require user authentication (YES in step S22), and custom information corresponding to the ID detected in step S12 has been registered in the customization information table, MFP 100 displays an operation screen customized using this custom information (step S30).

When the custom information corresponding to the ID detected in step S12 has not been registered in the customization information table, MFP 100 displays the screen for the public as the operation screen (step S34). Moreover, MFP 100 registers a setting customized in this user's operation in the user table (step S36).

The setting registered in step S36 may be limited to a setting for the operation allowed in the public mode. The setting registered may be, other than the setting for language on the operation screen, a setting for image processing operation. For example, when MFP 100 can perform three types of operations of copying, scanning and printing, and copying is the only operation allowed (executed) in the public mode, then the setting registered in step S36 may only be a setting for copying operation. Namely, a setting for scanning and a setting for printing do not need to be registered in step S36.

[5. Addition of Information to Customization Information Table]

Figure 8:
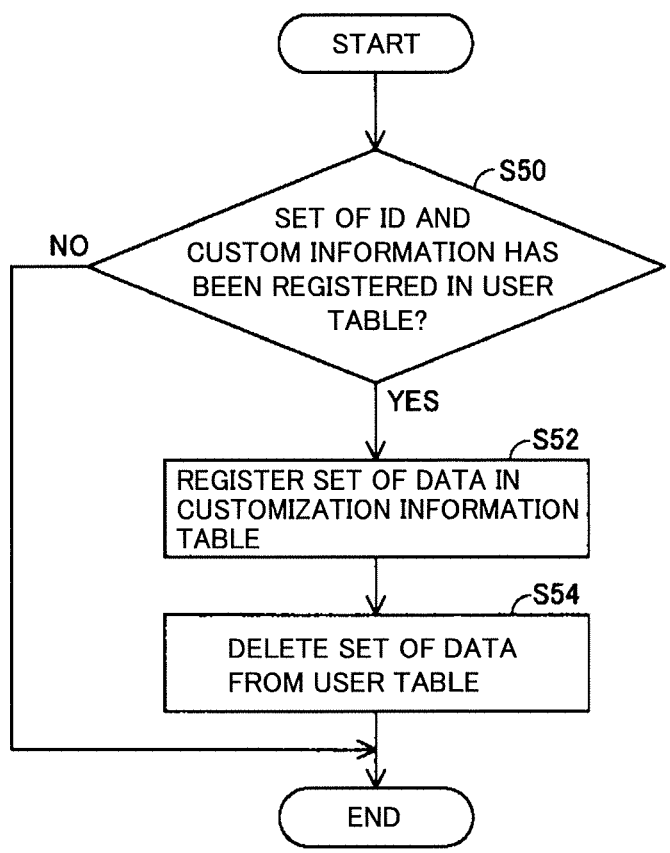
FIG. 8 is a flowchart of an example process for adding information to the customization information table according to one or more embodiments.

FIG. 8 is a flowchart of an example process for adding information to the customization information table according to one or more embodiments. The process of FIG. 8 is a process for moving the registered contents stored in the user table (FIG. 7 and the like) to the customization information table, and is implemented by CPU 101a executing a given program, for example. CPU 101a causes the process of FIG. 8 to be performed upon end of the operation of MFP 100 by the user, or at regular intervals, for example. The contents of this process are described with reference to FIG. 8.

In step S50, CPU 101a determines whether or not a set of an ID and custom information has been registered in the user table. In FIG. 6, the ID "AACD:fFF1" has been registered, but no custom information associated with this ID "AACD:fFF1" has been registered. It is determined, therefore, that a set of an ID and custom information has not been registered in the state of FIG. 6. In FIG. 7, on the other hand, the ID "AACD:fFF1" and the custom information "A (Japanese)" associated with this ID "AACD:fFF1" have been registered. It is determined, therefore, that a set of an ID and custom information has been registered in the state of FIG. 7.

When it is determined that the aforementioned set has been registered in the user table (YES in step S50), CPU 101a causes the control to proceed to step S52, and otherwise (NO in step S50) causes the process of FIG. 8 to end.

In step S52, CPU 101a causes the set of data that has been registered in the user table to be registered in the customization information table. FIG. 9 shows the customization information table of FIG. 3, in which the registered set of data in FIG. 7 has been registered. In the table of FIG. 9, information associated with the ID "AACD:fFF1" has been added as compared to the table of FIG. 3. The added information includes, in addition to the type "beacon" and the custom information "A (Japanese)" associated with the ID "AACD:fFF1" in the user table (FIG. 7), a username "Public" and an allowed function "copy." The allowed function "copy" in the added information represents a function allowed in the public mode.

Returning to FIG. 8, in step S54, CPU 101a causes the set of data that was registered in the customization information table in step S52 to be deleted from the user table. CPU 101a then causes the process of FIG. 8 to end.

[6. Other Examples of Custom Information]

The custom information may include information other than the language on the operation screen. FIG. 10 represents another example customization information table according to one or more embodiments. The example of FIG. 10 shows, as the custom information, default settings for image processing operation displayed on the operation screen.

For the username "Yamada," for example, "2in1" has been registered as a default setting for "page integration," "color" has been registered as a default setting for "output," "color" has been registered as a default setting for "read," and "box A" has been registered as a default setting for "save destination."

The "page integration" is a setting for the function of integrating and forming images on a plurality of documents onto a single sheet of paper in output of copying or printing. On the operation screen displayed for the username "Yamada," the default setting for the "page integration" is "2in1."

The "output" is a color/monochrome setting for an image outputted in copying or printing. On the operation screen displayed for the username "Yamada," the default setting for the "output" is "color."

The "read" is a color/monochrome setting for reading of a document in copying or scanning. On the operation screen displayed for the username "Yamada," the default setting for the "read" is "color."

The "save destination" is a setting for a save destination of data generated in scanning. On the operation screen displayed for the username "Yamada," the default setting for the "save destination" is "box A" (one of storage areas set in storage unit 107).

In the example of FIG. 10, for the username "Public," "4in1" has been registered as a default setting for the "page integration," and "color" has been registered as a default setting for each of the "output" and the "read."

For the username "Public," no default setting has been registered for the "save destination." This corresponds to the fact that scanning is not allowed in the public mode.

Namely, "copy" is the only allowed function associated with the username "Public." In the public mode, only copying is possible and printing and scanning are not allowed. The "save destination" is a setting related to scanning, and not related to copying. Accordingly, a default setting for the "save destination" has not been registered for the user having the username "Public" who performs operation in the public mode that does not allow scanning.

In MFP 100, contents registered as the custom information may be a combination of the default setting for image processing operation as described with reference to FIG. 10, and the default setting for language on the operation screen as described with reference to FIG. 3.

[7. Variation of Process for Displaying Operation Screen]

CPU 101a may also cause an "ID" of a user whose username and password have been registered to be registered in the customization information table. In the process of FIG. 4, after it is determined that the user has been successfully authenticated in step S18, CPU 101a causes the customized screen to be displayed in step S20. On this occasion, CPU 101a causes the acquired ID to be registered, in association with the successfully authenticated user, in the customization information table.

FIG. 11 shows example contents of the customization information table, to which an ID of a successfully authenticated user has been added, according to one or more embodiments. In FIG. 11, information about the username "Yamada" has been added as compared to FIG. 3. More specifically, in FIG. 11, a type "beacon" and an ID "AACD: AAAA" have been added for the username "Yamada."

Figure 12:
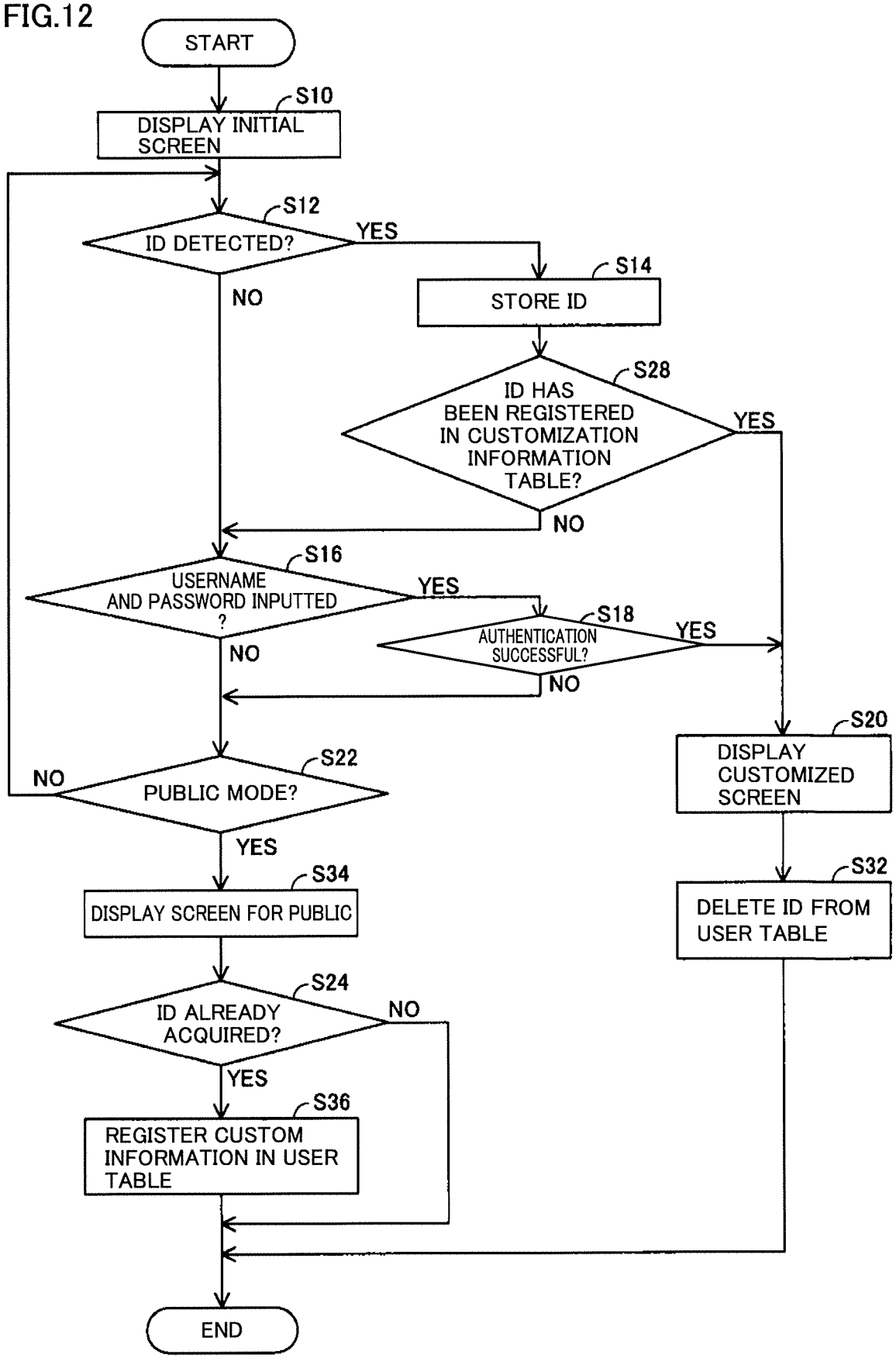
FIG. 12 is a flowchart of a variation of the process for determining a display manner on the operation screen according to one or more embodiments.

FIG. 12 is a flowchart of a variation of the process for determining a display manner on the operation screen according to one or more embodiments. The contents of control of the steps in FIG. 12 may be the same as the contents of the steps in FIG. 4 except for the following specifically described cases.

When wireless communication control unit 104 acquires information registered as an "ID" in the customization information table, MFP 100 authenticates a user of this "ID" without requiring input of a username and a password, and displays a screen customized for this "ID" without requiring operation of public mode button 504.

More specifically, in the process of FIG. 12, in step S14, CPU 101a causes the ID detected in step S12 to be stored in the user table. Then, in step S28, CPU 101a determines whether or not the ID registered in the user table has been registered in the customization information table. When it is determined that the aforementioned ID has been registered in the customization information table (YES in step S28), CPU 101a causes the control to proceed to step S20, and otherwise (NO in step S28) causes the control to proceed to step S16.

In step S20, CPU 101a causes touch panel display 120 to show a screen customized for the ID registered in the user table as the operation screen. The settable functions on the screen in step S20 of FIG. 12 vary with the ID registered in the user table (the ID detected in step S12). When the ID is "AACD:AAAA" (see FIG. 11), the settable functions on the screen in step S20 of FIG. 12 are the functions allowed for the username "Yamada," namely, copying and scanning. When the ID is "AACD:fFFA" (see FIG. 11), the settable function on the screen in step S20 of FIG. 12 is the function allowed in the public mode, namely, only copying.

Subsequently, CPU 101a causes the registered ID to be deleted from the user table in step S32, and then causes the process of FIG. 12 to end.

According to the description above, MFP 100 acquires the ID of an authenticated user from a beacon or an IC card, and registers this ID in association with this user (the username "Yamada" in FIG. 11). Subsequently, when MFP 100 acquires this ID, MFP 100 authenticates this user without input of a password ("YES" in step S28 of FIG. 12). As a result, once a user is authenticated by MFP 100 while carrying a device that transmits an ID, the user can be authenticated by MFP 100 without inputting a password by carrying the device that transmits the same ID. Accordingly, the need for cumbersome operation of inputting a password is reduced in MFP 100, so that user convenience is improved.

In addition, when MFP 100 detects an ID registered in the past for a user in the public mode, MFP 100 also displays a customized screen without requiring operation of public mode button 504 ("YES" in step S28 of FIG. 12). As a result, once a user uses MFP 100 by operating public mode button 504 while carrying a device that transmits an ID, the user can use MFP 100 thereafter without operating public mode button 504 by carrying the device that transmits the same ID. MFP 100 starts a process for displaying the customized screen without waiting for the operation of public mode button 504. As a result, the user approaching MFP 100 can immediately use MFP 100 upon arriving in front of touch panel display 120.

[8. Variation of Customization Information Table]

In one or more embodiments of the present invention, when a first interface (touch panel display 120) acquires information required for user authentication, a controller (CPU 101a) causes a display to show an operation screen customized using a customization information table for a user authenticated through the user authentication. When the first interface does not acquire the information required for user authentication, the controller causes the display to show an operation screen customized using the customization information table for a user identified by information acquired by a second interface (wireless communication control unit 104).

The "customization information table" in FIG. 3 stores information used to customize the operation screen for the authenticated user (such as the username "Yamada"), and information used to customize the operation screen for the non-authenticated user (the username "Public"). In MFP 100, the customization information table may be formed of a plurality of tables storing these two types of information, respectively. Namely, the customization information table may include a first table storing the former information and a second table storing the latter information. In this case, when the first interface acquires the information required for user authentication, the controller causes the display to show an operation screen customized using the first table for an authenticated user. When the first interface does not acquire the information required for user authentication, the controller causes the display to show an operation screen customized using the second table for a user identified by information acquired by the second interface. The first table and the second table may be stored in devices different from each other.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An image processing apparatus comprising:
a processor;
a first interface that acquires information for user authentication;
a second interface that acquires information for user identification; and
a memory that stores a customization information table defining information for customizing an operation screen displayed on the first interface, wherein
the processor displays:
when the first interface acquires the information for the user authentication, an operation screen customized, using the customization information table, for a user authenticated through the user authentication as the operation screen, and
when the first interface does not acquire the information for the user authentication, an operation screen customized, using the customization information table, for a user identified by the information acquired by the second interface as the operation screen.

2. The image processing apparatus according to claim 1, wherein
the second interface comprises a receiver that receives the information for user identification by wireless communication.

3. The image processing apparatus according to claim 1, wherein
the information for customizing the operation screen includes at least one of language used on the operation screen and a default setting for image processing operation.

4. The image processing apparatus according to claim 1, wherein
the information for customizing the operation screen includes a default setting for image processing operation,
the memory stores information for identifying a type of image processing operation allowed when the first interface does not acquire the information required for the user authentication, and
the default setting for the user identified by the information acquired by the second interface corresponds to the identified type of the image processing operation.

5. The image processing apparatus according to claim 1, wherein
the memory further stores:
a user table defining a set of information acquired by the second interface, and
information for customizing the operation screen for the user identified by the information acquired by the second interface, and
the processor registers, in the customization information table, the set of information stored in the user table.

6. The image processing apparatus according to claim 5, wherein
the processor deletes the set from the user table in conjunction with the registration.

7. The image processing apparatus according to claim 1, wherein
the processor controls:
when the first interface acquires the information required for the user authentication, the image processing apparatus to perform a function allowed for the authenticated user, and
when the first interface does not acquire the information required for the user authentication, the image processing apparatus to perform a function commonly allowed for users identified by the information acquired by the second interface.

8. A method of controlling an image processing apparatus, the method comprising:
determining, by a processor of the image processing apparatus, whether a first interface acquires information required for user authentication;
displaying, by the processor and when the first interface acquires the information required for the user authentication, an operation screen customized, using a customization information table, for a user authenticated through the user authentication as an operation screen displayed on the first interface, the customization information table defining information for customizing the operation screen; and
displaying, by the processor and when the first interface does not acquire the information required for the user authentication, an operation screen customized, using the customization information table, for a user identified by information acquired by a second interface that acquires information for user identification as the operation screen.

9. The method according to claim 8, wherein
the second interface comprises a receiver that receives the information for the user identification by wireless communication.

10. The method according to claim 8, wherein
the information for customizing the operation screen includes at least one of language used on the operation screen and a default setting for image processing operation.

11. A non-transitory recording medium storing a program executed by a processor of an image processing apparatus that comprises a first interface that acquires information for user authentication, a second interface that acquires information for user identification, and a memory that stores a customization information table defining information for customizing an operation screen displayed on the first interface, the program causing the processor to:
determine whether the first interface acquires the information required for the user authentication;
when the first interface acquires the information required for the user authentication, display an operation screen customized, using the customization information table, for a user authenticated through the user authentication as the operation screen; and
when the first interface does not acquire the information required for the user authentication, display an operation screen customized, using the customization information table, for a user identified by the information acquired by the second interface as the operation screen.

12. The recording medium according to claim 11, wherein
the second interface comprises a receiver that receives the information for the user identification by wireless communication.

13. The recording medium according to claim 11, wherein
the information for customizing the operation screen includes at least one of language used on the operation screen and a default setting for image processing operation.

* * * * *